US006347160B1

(12) United States Patent
Cheung et al.

(10) Patent No.: US 6,347,160 B1
(45) Date of Patent: Feb. 12, 2002

(54) INCREASING THE BIT DEPTH OF AND FILTERING DITHERED IMAGES FOR THE PURPOSE OF INVERSE DITHERING

(75) Inventors: Shiufun Cheung, Waltham; Robert A. Ulichney, Stow, both of MA (US); Robert MacNamara, Portola Valley, CA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/015,935

(22) Filed: Jan. 30, 1998

(51) Int. Cl.$^7$ ................................................. G06K 9/40
(52) U.S. Cl. ........................ 382/260; 382/261; 358/456
(58) Field of Search ................................ 382/260, 261, 382/264, 265; 358/455, 456, 457, 458; 702/190, 197

(56) References Cited

U.S. PATENT DOCUMENTS

| 4,926,268 A | * | 5/1990 | Kawamura et al. ......... 358/458 |
| 5,493,419 A | * | 2/1996 | Jodoin et al. ............... 358/455 |
| 5,598,184 A | | 1/1997 | Barkans ....................... 345/149 |
| 5,905,504 A | | 5/1999 | Barkans et al. ............. 345/431 |

FOREIGN PATENT DOCUMENTS

| EP | 405861 B1 | 8/1995 |
| EP | 0769741 A1 | 4/1997 |

OTHER PUBLICATIONS

Article– Display of Dithered Images by A. N. Netravali and E. G. Bowen of Bell Laboratories, 6 pgs Proceeding of the SID, vol. 22, No. 3, 1981.

Article: Inverse Halftoning by Christopher M. Miceli and Kevin J. Parker of University of Rochester, 9 pgs., Journal of Electronic Imaging, Apr. 1992, vol. 1, No. 2.

Article: Halftone to Continuous–Tone Conversion of Error–Diffusion Coded Images by Soren Hein and Avideh Zakhor of University of California, 32 pgs. Proceedings of the IEEE International Conference on Acoustics Speech, Signal Processing (ICASSP) 4/27–30/93, vol. V.

Article: HP Color Recovery Technology, by Anthony C. Barkans, Apr. 1995 Hewlett–Packard Journal, 9 pgs.

Article: Inverse Halftoning Using Wavelets by Zixiang Xiong, Michael T. Orchard and Kannan Ramchandran, Proceedings of the IEEE International Conference on Image Processing, Sep. 1996, 3 pgs.

Universal Descreening Technique Via Wavelet Analysis by Jiebo Luo, Ricardo de Queiroz, Zhigang Fan, 1997 IS&T SPIE Symposium of Electronic Imaging Science and Technology; 12 pgs.

Kim, et al. "Inverse Halftoning Using Binary Permutation Filters" IEEE pp. 1296–1311 Sep. 1995.

Liu et al. "Subpixer Edge Location in Binary Images Using Dithering" IEEE pp. 629–634 Jun. 1995.

Stevenson, "Inverse Halftoning Via Map Estimation" IEEE pp. 574–583 Apr. 1997.

* cited by examiner

Primary Examiner—Thomas D. Lee
(74) Attorney, Agent, or Firm—Leah Sherry; Anthony Diepenbrock, III; Oppenheimer Wolff & Donnelly LLP

(57) ABSTRACT

A method for inverse dithering a dithered image using a filter selected from a set of filters arranged in a preselected order is disclosed. Upon receipt of a selected portion of a dithered image, the selected portion is up-multiplied from a first amplitude resolution to a second amplitude resolution. The up-multiplied dithered image at the second amplitude resolution is then filtered by the selected filter coefficients to generate the inverse dithered image.

28 Claims, 7 Drawing Sheets

INCREASING THE BIT DEPTH OF AND FILTERING DITHERED IMAGES FOR THE PURPOSE OF INVERSE DITHERING

CROSS REFERENCE TO RELATED APPLICATIONS

This application is related to the following U.S. patent applications: application Ser. No. 09/015,934, by Cheung et al., filed Jan. 30, 1998, entitled "EDGE DETECTION OF A DITHERED IMAGE"; application Ser. No. 09/016,317, by Cheung et al., filed Jan. 30, 1998, entitled "SELECTIVE FILTERING OF A DITHERED IMAGE FOR THE PURPOSE OF INVERSE DITHERING"; application Ser. No. 09/016,316, by Cheung et al., filed Jan. 30, 1998, entitled "METHOD FOR LOW COMPLEXITY, LOW MEMORY INVERSE DITHERING".

BACKGROUND OF THE INVENTION

1. Technical Field of the Invention

The present invention relates to inverse dithering, and more particularly, to a method for increasing the bit depth of and filtering a dithered image in accordance with a selected filter to generate an inverse dithered image.

2. Description of Related Art

Dithering has long been a method to maintain the perceptual quality of continuous tone images in low bit depth video displays. The illusion of true continuous tone images can be produced on display devices incapable of providing a required number of amplitude levels necessary for achieving a full, continuous tone image by dithering. By dithering the images they may be displayed on systems having low bit-depth frame buffers while maintaining a reasonable image quality. The technique is also referred to as half-toning when the result produces a binary (black and white) image. Dithering enables a respectable display at a lower amplitude resolution by distributing quantization noise over small areas.

One process for improving the quality of a dithered image is referred to as inverse dithering. Inverse dithering strives to restore the original continuous tone nature of a predithered image. In inverse dithering, low-pass filters are used to reverse the effects of dithering such as graininess of the picture. However, use of low-pass filtering tends to blur the object edges of the image. Therefore, the inverse dithering process must ultimately achieve two conflicting goals. First, the effects of the original dithering must be smoothed, and at the same time the object edges or the high-frequency content of the original image must be maintained without undesirable blurring.

Inverse dithering may be discussed in a larger context of an image-rendering system. As illustrated in FIG. 1, a simplified image-rendering system consists of a dithering system 10 that receives as input, pixel values of an image I(x,y). The originally received image may be a monochromatic or a color image. The original image I(x,y) will have an amplitude resolution of q' bits per pixel and the pixel values will be within the range of $$I(x,y) \in \{0,1,2, \ldots, 2^{q'}-1\}. \quad (1)$$

The image I(x,y) is reduced in amplitude resolution to m bits per pixel by the dithering process. The dithered image $I_d(x,y)$ will consist of pixels having values within the range of $$I_d(x,y) \in \{0,1,2, \ldots, 2^m-1\}. \quad (2)$$

The dithered image $I_d(x,y)$ is processed by an image buffer 15 which in many computer display systems would typically comprise a frame buffer. However, the image buffer may comprise any number of other apparatuses for holding or transporting an image such as a communication channel. The image buffer 15 actually drives the necessity for amplitude reduction of the original image I(x,y) due to the limited amount of memory in the buffer for storage or the narrow bandwidth of a communication channel.

The inverse dithering system 20 receives the dithered image $I_d(x,y)$ and produces a reconstructed image $I_r(x,y)$ having a higher amplitude resolution of q"-bits per pixel. The amplitude resolution of the original and reconstructed images may be the same, but this is not required. The reconstructed image will have pixel values within the range $$I_r(x,y) \in \{0,1,2, \ldots, 2^{q''}-1\}. \quad (3)$$

A variety of methods have been developed for performing inverse dithering. The majority of these methods have been focused on the specialized case of inverse half-toning or, in other words, recovery of full gray scale from binary images. In one technique, a gray scale image is constructed from a binary image by means of a statistically generated lookup table. This method utilizes statistics generated during the original dithering process to perform the statistical analysis necessary to generate the lookup table. The statistical analysis requires complex calculations, and the storage of the lookup table greatly increases the memory requirements.

Another method utilizes cascading of adaptive run-length algorithms with statistical smoothing and impulse removal. A class of iterative, nonlinear algorithms have been proposed that are based on the theory of Projection Onto Convex Sets (POCS). This technique involves performing multiple iterations of an inverse dithering process until a final inverse dithered image is determined. This requires a great deal of processing due to the multiple iterations. Other methods have used information generated by a wavelet decomposition to perform the inverse dithering process.

There are also methods for reconstructing a dithered color image referred to as "color recovery". The color recovery technique requires a renormalization process that increases the overhead requirements for processing the inverse dithering algorithm.

Some of the aforementioned techniques require prior knowledge of the dither mask used to dither the original image. Also, most of these methods involve highly complex calculations and require a great deal of memory in order to perform the inverse dithering processes. These requirements limit the ease and speed in which an inverse dithering process may be performed. Thus, there has arisen a need for a method of inverse dithering that is substantially less computationally complex and requires less memory resources than those of methods presently utilized.

OBJECT OF THE INVENTION

Accordingly, it is an object of the present invention to provide a method and apparatus for inverse dithering an image which has been dithered according to any of a plurality of known dithering methods.

It is also an object of the present invention to provide a technique for increasing the bit depth of a received portion of the dithered image from a first amplitude resolution to a second amplitude resolution.

It is yet another object of the present invention to provide a technique for filtering a portion of the dithered image at a second amplitude resolution to generate an inverse dithered image.

It is still further an object of the present invention to provide further advantages and features, which will become more apparent to those skilled in the art from the disclosure, including the preferred embodiment, which shall be described below.

SUMMARY OF THE INVENTION

The present invention overcomes the foregoing and other problems with a system and method for inverse dithering a dithered image. The system includes a plurality of digital filters which are preferably arranged in a preselected order. The digital filters are typically either horizontally symmetric digital filters or members of a horizontally asymmetric digital filter pair. The filters can be ordered according to a predetermined set of rules such that filters having a higher index never include a subset of a lower indexed filter. The filters may also be ordered such that asymmetric digital filter pairs always include adjacent filtering indices. Finally, digital filters covering the same region of support also beneficially have adjacent indices and are ordered in increasing cutoff frequency order.

A system processor receives information on a selected one of the plurality of digital filters and information concerning a selected portion of the dithered image. The selected portion of the dithered image is multiplied by a gain factor such that the selected portion of the dithered image is increased from a first amplitude resolution to a second amplitude resolution. The image at the second amplitude resolution is expressed in a greater number of bits than the image at the first amplitude resolution. This process of up-mutiplication may be carried out in a variety of ways including methods such as bit replication of the selected portion of the dithered image.

In a first embodiment of the invention, the selected portion of the image at the second amplitude resolution is multiplied by the filter coefficients of the selected filter to generate a selected portion of the inversed dithered image. This process may then be repeated for each portion of the dithered image until the entire inverse dithered image is recreated.

In another embodiment, after increasing the bit depth of the selected portion of the dithered image to a second amplitude resolution, a difference map of the selected portion of the dithered image is generated in accordance with the selected filter. This difference map is utilized to select a correction factor stored within a correction table. The correction factor is added to the up-multiplied selected portion of the dithered image at the second amplitude resolution to generate the selected portion of the inverse dithered image. The correction table is generated from the coefficients of a filter set including the selected filter.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
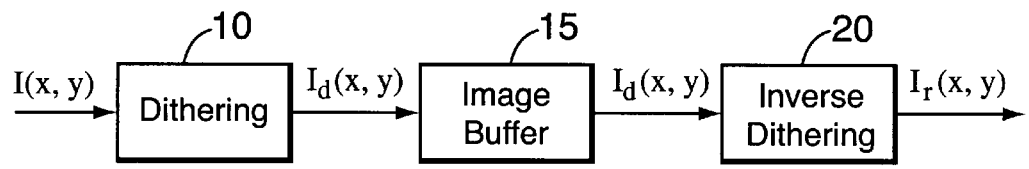
FIG. 1 is a functional block diagram of a simplified image rendering system.
Figure 2:
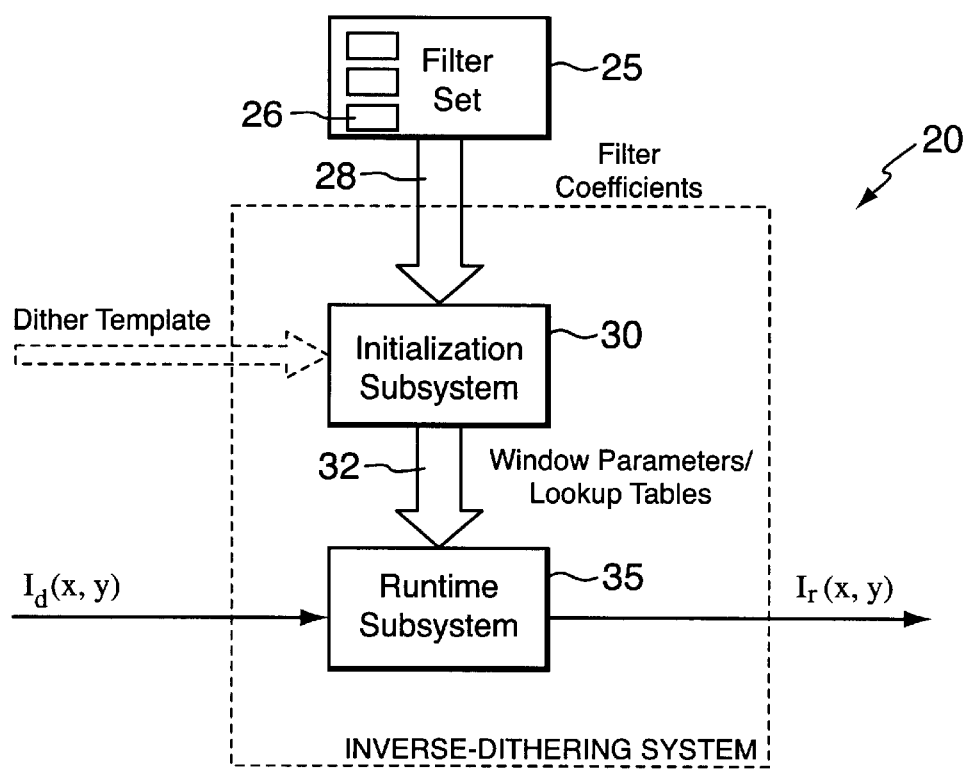
FIG. 2 is a block diagram of the inverse dithering system of the present invention.
Figure 2A:
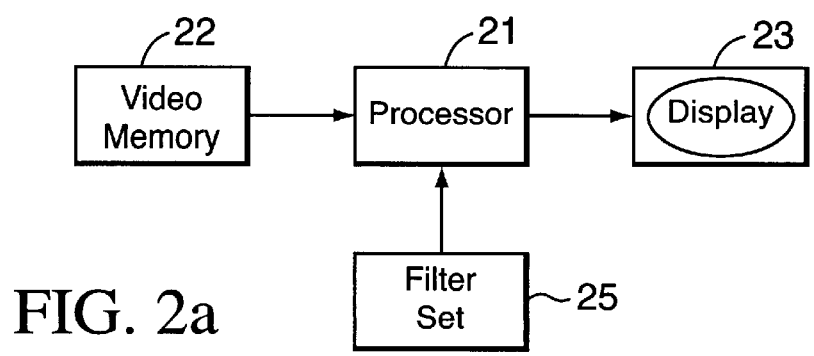
FIG. 2a is a block diagram of a processor implementation of the inverse dithering system of the present invention.

Referring now to the Drawings, and more particularly to FIGS. 2 and 2A there is illustrated a block diagram of an inverse dithering system 20. The system 20 receives a dithered image $I_d(x,y)$ in serial form, processes it and outputs a reconstructed image $I_r(x,y)$. The inverse dithering system 20 is optimally implemented within a processor 21 utilizing software or firmware to perform the functionalities of the initialization subsystem 30 and runtime subsystem 35. The processor 21 receives the dithered image as input from video memory 22 and outputs the inverse dithered image to a display device 23. The inverse dithering system 20 works in conjunction with a filter set 25 including multiple filters 26 that enable the inverse dithering system to process the dithered image using an edge sensitive low-pass filtering approach. Each filter 26 of the low-pass filter set 25 include filter coefficients 28 which are provided to an initialization system 30 of the inverse dithering system 20.

The initialization subsystem 30 computes various parameters 32 required by the runtime subsystem 35 to generate the reconstructed image $I_r(x,y)$. These parameters include the size of a window processed with each pixel of the dithered image, and, optionally, a correction lookup table utilized by the filtering process and, also optionally, a pattern match lookup table for use with a filter selection process. The runtime subsystem 35 utilizes the parameters provided by the initialization subsystem 30 to process the dithered image $I_d(x,y)$ and generate the reconstructed image $I_r(x,y)$.

Figure 3:
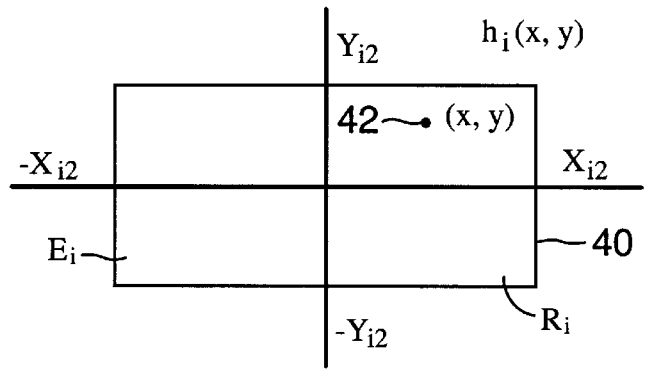
FIG. 3 is an illustration of a region of support of a low-pass filter.

The filter set 25 comprises a predefined set of digital low-pass, finite impulse response filters 26. Each filter 26 is defined by a number of filter coefficients and an impulse response, $h_i(x,y)$, where $(x,y)$ denotes the spatial coordinates relative to the pixel being processed and i comprises the index of the filter being used. Referring now to FIG. 3, there is illustrated the impulse response of a filter 26. The filter is defined as being finite-extent meaning that $$h_i(x,y)=0 \text{ for } x<-X_{i1} \text{ or } x>X_{i2} \text{ or } y<Y_{i1} \text{ or } x>Y_{i2}. \qquad (4)$$

Equation (4) illustrates that the filter presented in FIG. 3 has an impulse response $h_i(x,y)$ equal to zero for anything outside the region of support ($R_i$). The filter extents $-X_{i1}$, $X_{i2}$, $-Y_{i2}$, and $Y_{i2}$ represent the boundaries of the impulse response of the filter 26 on the X and Y axis.

Each point 42 within the region of support $R_i$ 40 has associated with it a particular value representing the filter coefficient $h_i(x_0,y_0)$ associated with that point $(x_0,y_0)$. To maintain normalization, the filter coefficients $h_i(x_0,y_0)$ (values) associated with each of these points 42 will sum to unity.

$$\sum_x \sum_y h_i(x, y) = 1.0. \qquad (5)$$

The region of support $R_i$ for the filter is defined as $$R_i = \{(x,y) | h_i(x',y') \neq 0 \, \forall x' \leq x \text{ and } y' \leq y\} \qquad (6)$$

and encloses a plurality of values $h_i(x,y)$ denoting the filter coefficients within $R_i$. The frequency response $H_i(f_x,f_y)$ of each filter 26 is given by $$H_i(f_x, f_y) = K \sum_x \sum_y h_i(x, y) e^{-j2\pi x f_x} e^{-j2\pi y f_y} \qquad (7)$$

Given the frequency response the cutoff frequency $f_c$ of the filter 26 is defined as $$\iint_{\sqrt{f_x^2 + f_y^2} \leq f_c} H_i(f_x, f_y) = \frac{3}{4} \iint_{all(f_x,f_y)} H_i(f_x, f_y) \qquad (9)$$

The filters 26 within the filter set 25 are designed to fit into one of two categories. The filter 26 may be horizontally symmetric. In which case, the impulse response of the filter must have the following characteristics:

$$X_{i1} = X_{i2} \text{ and } h_i(-x_0, y_0) \text{ for all } (x_0,y_0) \qquad (10)$$

Figure 4A:
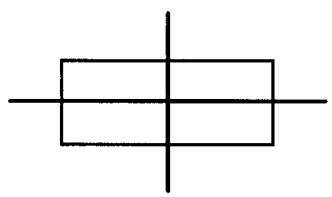
FIG. 4a is an illustration of a region of support of a symmetrical filter.

The region of support of a horizontally symmetric filter is represented in FIG. 4a where it can be seen that for every point on the left side of the Y axis there is a corresponding point on the right side of the Y axis.

Additionally, the filter 26 may comprise one member of a horizontally asymmetric filter pair in which case the impulse response of a filter pair $h_i(x,y)$ and $h_j(x,y)$ would have the characteristics:

$$X_{i1} = X_{j2}, X_{j1} = X_{i2} \text{ and } h_i(-x_0,y_0) = h_j(-x_0,y_0) \text{ for all } (x_0,y_0) \qquad (11)$$

Figure 4B:
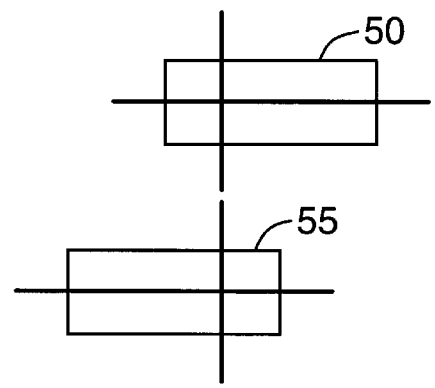
FIG. 4b is an illustration of regions of support for a pair of asymmetrical filters.

FIG. 4b illustrates a horizontally asymmetric filter pair wherein for every point on the left side of the Y axis for filter 50 there is a corresponding point on the right side of the Y axis in filter 55, and for every point on the right side of the Y axis for filter 50 there is a corresponding point on the left side of the Y axis in filter 55.

In addition to designing the filters 26 according to the above-identified constraints, the filters of the filter set 25 must be ordered according to a set of predetermined rules in order that the filter selection process may be more efficiently implemented within the runtime subsystem 35. The filters 26 are ordered according to the filter index (i). The filter index (i) is assumed to start at 1 and increase without interruption in increments of 1. The index 0 is reserved for the choice of no filtering. The filter index represents the order in which the filters will be considered during the filter selection process which will be more fully discussed in a moment.

The ordering of the filters 26 is subject to the following rules. First, in order for the filter selection process to make sense, filters 26 having lower index numbers must have an area of support $R_i$ that extends in at least one direction further than the area of support $R_j$ of filters having higher index numbers. In other words, the region of support of a filter 26 of index i cannot be a subset of the region of support of a filter having an index less than i. Second, asymmetric filter pairs as illustrated in FIG. 4b must have adjacent indices. This causes asymmetric filter pairs to be consecutively considered during the filter selection process. Finally, symmetric filters having the same region of support, which are referred to as "identical-support filters", must also have adjacent indices. The identical-support filters will be ordered according to increasing cutoff frequencies. Thus, an identical-support filter with an filter index of 3 will have a lower cutoff frequency than an identical support filter having an index of 4.

Figure 5:
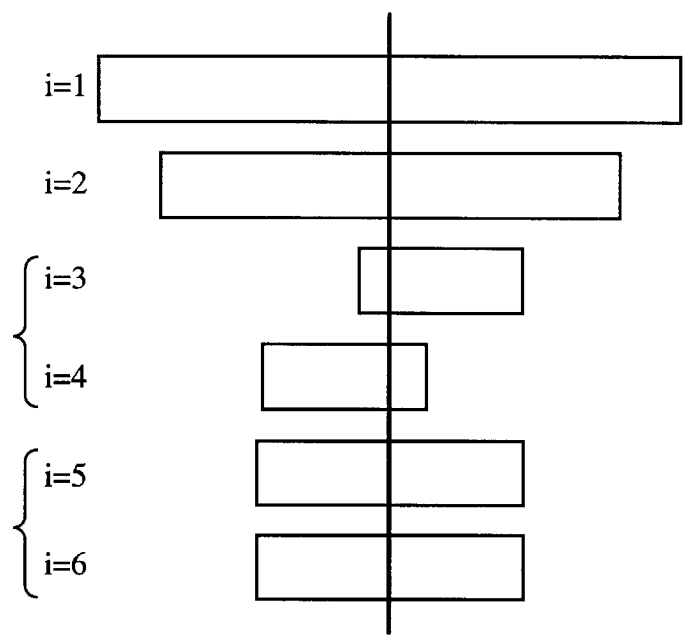
FIG. 5 illustrates the ordering of a filter set according to the present invention.

Referring now to FIG. 5, there are illustrated the regions of support $R_i$ for one particular instance of a filter set 25 consisting of six separate filters 26. The first rule for filter ordering is illustrated wherein it can be seen that the first filter having an index of 1 covers a larger region of support than any of the subsequent filters for indices i=2 through i=6. For each filter 26 the previous filters always covers some region not covered by the subsequent filter. The second rule is illustrated between filters 26 represented by indices i=3 and i=4. These filters 26 comprise an asymmetric filter pair having adjacent indices (i.e., 3 and 4). Finally, the filter pair having indices of 5 and 6 comprises and adjacent identical support filter pair wherein the filter having an index of 5 will have a lower cutoff frequency than the filter having an index of 6.

Referring now to the following example, there is illustrated one embodiment for a filter set 25 of the present invention, including five filters having various areas of support.

$h_1(-4,0)=0.0156$, $h_1(-3,0)=0.1016$, $h_1(-2,0)=0.1406$, $h_1(-1,0)=0.1563$, $h_1(0,0)=0.1718$, $h_1(1,0)=0.1563$, $h_1(2,0)=0.1406$, $h_1(3,0)=0.1016$, $h_1(4,0)=0.0156$, $h_1(x,y)=0.0$ for $x<-4$, $x>4$, $y<0$, $y>0$.

$h_2(-2,0)=0.0625$, $h_2(-1,0)=0.2500$, $h_2(0,0)=0.3750$, $h_2(1,0)=0.2500$, $h_2(2,0)=0.0625$, $h_2(x,y)=0.0$ for $x<-2$, $x>2$, $y<0$, and $y>0$.

$h_3(-3,0)=0.0625$, $h_3(-2,0)=0.1250$, $h_3(-1,0)=0.3750$, $h_3(0,0)=0.4375$, $h_3(x,y)=0.0$ for $x<-3$, $x>0$, $y<0$, and $y>0$.

$h_4(0,0)=0.04375$, $h_4(1,0)=0.3750$, $h_4(-2,0)=0.1250$, $h_4(3,0)=0.0625$, $h_4(x,y)=0.0$ for $x<0$, $x>3$, $y<0$, and $y>0$.

$h_5(-1,0)=0.2500$, $h_5(0,)=0.5000$, $h_5(1,0)=0.2500$, $h_5(x,y)=0.0$ for $x<-1$, $x<-1$, $x>1$, $y<0$, and $y>0$.

Figure 6:
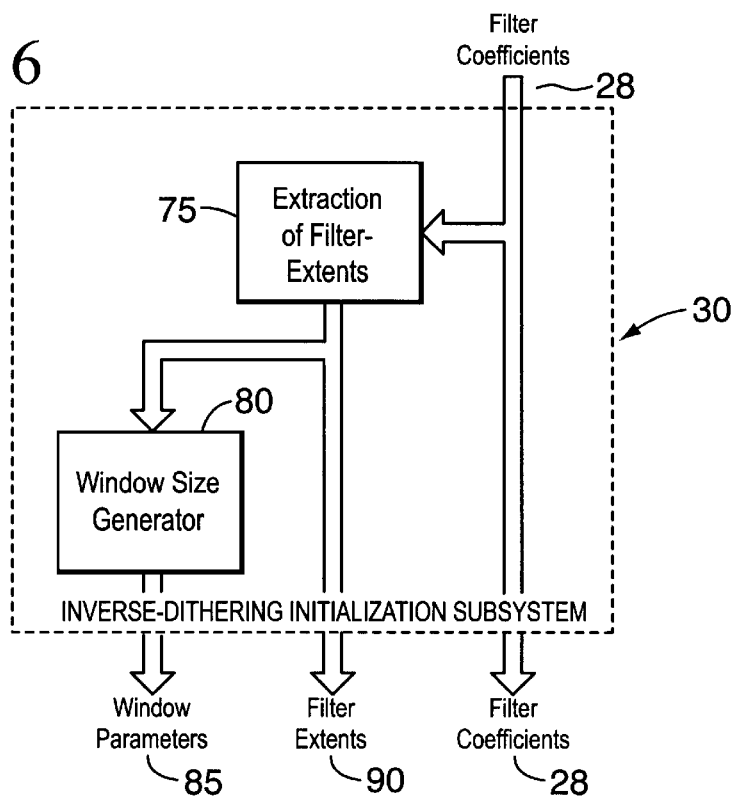
FIG. 6 is a block diagram of the initialization system.

Referring now to FIG. 6, there is illustrated a first embodiment of the initialization subsystem 30. The initialization subsystem 30 performs the processing that is necessary to generate the parameters and tables necessary for execution of the runtime subsystem 35 operations of the inverse dithering system 20. The initialization subsystem 30 routines are performed prior to the inverse dithering processes executed by the runtime subsystem 35. The initialization subsystem 30 receives filter coefficients 28 from the filter set 25. The filter coefficients 28 are input into an extraction of filter extents module 75 wherein the filter extents are extracted. The low pass filters are designed to have a finite impulse response as follows:

$$h_i(x,y)=0 \text{ for } x<-X_{i1} \text{ or } x>X_{i2} \text{ or } y>Y_{i1} \text{ or } x>Y_{i2}. \qquad (12)$$

The values of $X_{i1}, X_{i2}, Y_{i1}$, and $Y_{i2}$ represent the extents of the filter 26 having impulse response $h_i(x,y)=0$ and can be derived from the filter coefficients 28.

The filter extents are input into the window size generator module 80 wherein the parameters for a sizing window for processing the dithered image are generated. The window size generator module 80 generates various parameters for a window to be used by the runtime subsystem 35. These parameters are defined as $\Delta x$, $\Delta y_1$ and $\Delta y_2$. These parameters are dependent upon the extents of the filters 26 generated by the extraction of filter extents module 75. The window defined by the parameters must be large enough to cover the largest of the filters 26. The window parameters are given by the equations $$\Delta x = \max X_{i1} = \max X_{i2}, \qquad (13)$$

$$\Delta y_1 = \max Y_{i1}, \qquad (14)$$

$$\Delta y_2 = \max Y_{i2}. \qquad (15)$$

The initialization subsystem 30 outputs the window parameters 85, filter extents 90 and filter coefficients 28 to the runtime subsystem 35 as the window parameter/lookup tables 32 illustrated previously with respect to FIG. 2.

Figure 7:
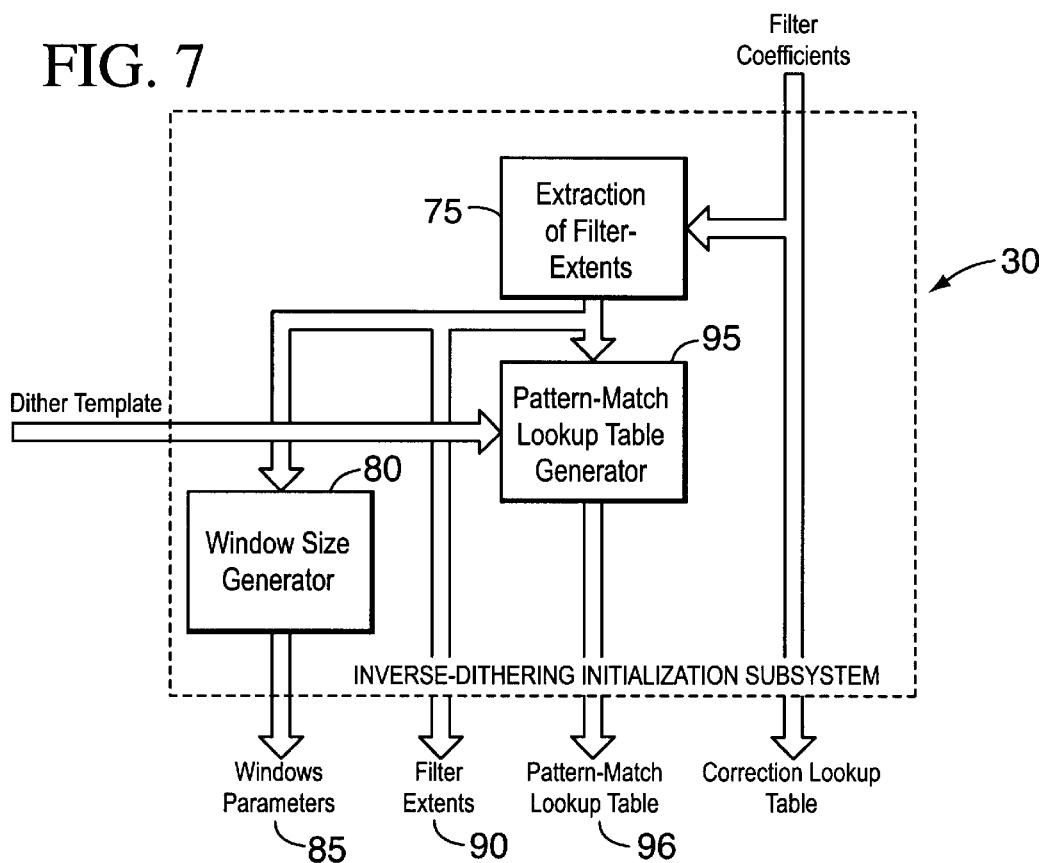
FIG. 7 is a block diagram of an alternative embodiment of the initialization system.

Referring now to FIG. 7, there is illustrated an alternative embodiment for the initialization subsystem 30 wherein knowledge of the particular dither method utilized to originally process the dithered image is utilized to improve the inverse dithering process. For certain dither methods, edge detection in the inverse dithering module can be performed using pattern matching to achieve greater accuracy during the inverse dithering process. To enable the use of pattern matching to operate efficiently within the runtime subsystem 35, a precomputation of valid difference map patterns must be generated.

In the alternative embodiment illustrated in FIG. 7, the initialization subsystem 30 includes the filter extents extraction module 75 and window size generator 80 which operate exactly as previously discussed with respect to FIG. 6. Additionally, a pattern match lookup table generator module 95 is included for generating the pattern matching parameters. The pattern match lookup table generator module 95 utilizes a dither template 34 in conjunction with the extents of the filters 26 calculated by the filter extents extraction module 75 to generate possible dither patterns. From these generated dither patterns, valid difference maps of the region of support $R_i$ of each filter 26 are derived. These are then forwarded to the runtime subsystem 35 in table form 96.

Figure 8:
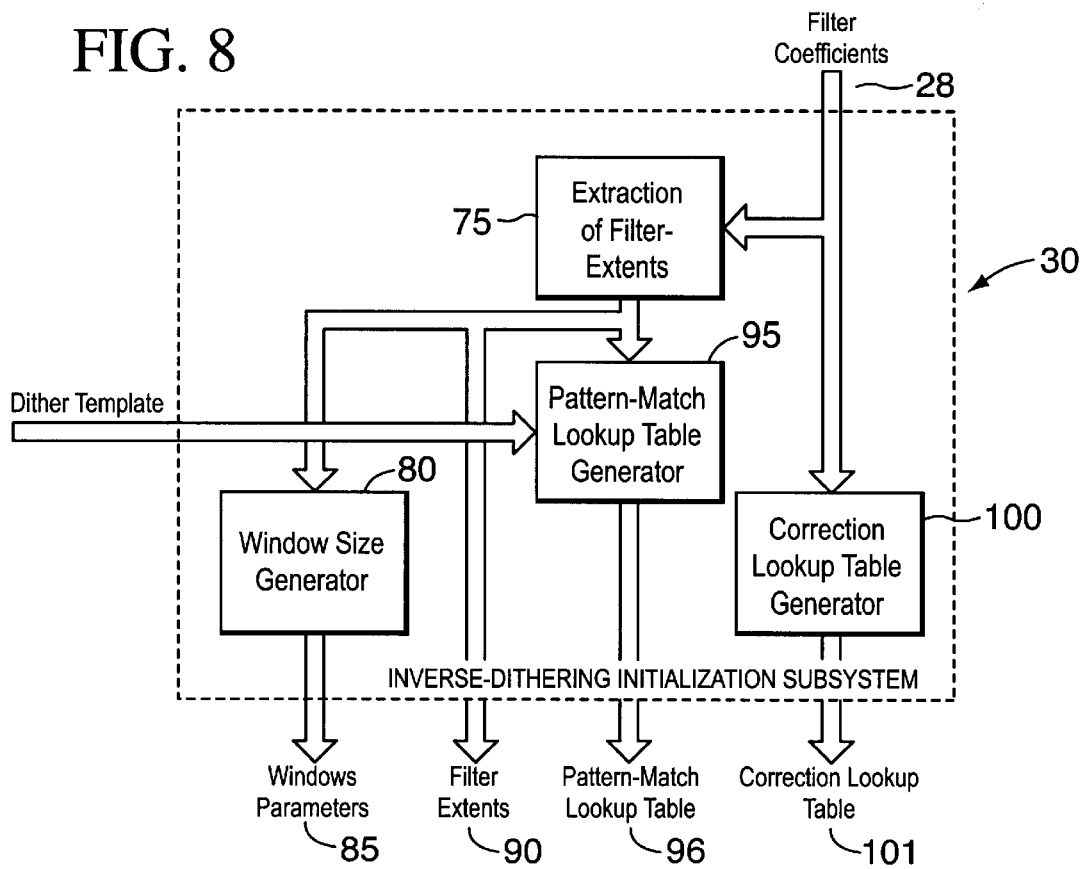
FIG. 8 is a block diagram of yet another alternative embodiment of the initialization subsystem.

Referring now to FIG. 8, there is illustrated yet another embodiment of the initialization subsystem 30, which utilizes implementation shortcuts for filtering. These shortcuts reduce the complexity of the system by using additional memory. One way in which the efficiency of the runtime subsystem 35 may be improved is to utilize a lookup table for correction terms used to implement various filtering modules which will be discussed more fully with respect to the runtime subsystem 35. This correction table may also be generated by the initialization subsystem 30. A correction term $C_{ij}$ is generated for each filter and for each valid difference map pattern according to the equation $$C_{ij} = G \cdot \sum_{(u,v) \in R_1} h_i(u, v) \cdot d_{ij}(x - u, y - v) \qquad (16)$$

where i is the filter index, j is the index for the difference-map pattern, $d_{ij}$ represents a valid pattern and G is the ideal gain represented by $$G = \frac{2^q - 1}{2^m - 1}. \qquad (17)$$

The table of correction terms is generated by the correction look-up table generator module 100. The module 100 outputs the terms, in table form 101, for use by the runtime subsystem 35. The remainder of the modules within the embodiment illustrated in FIG. 8 operate as discussed previously.

Figure 9:
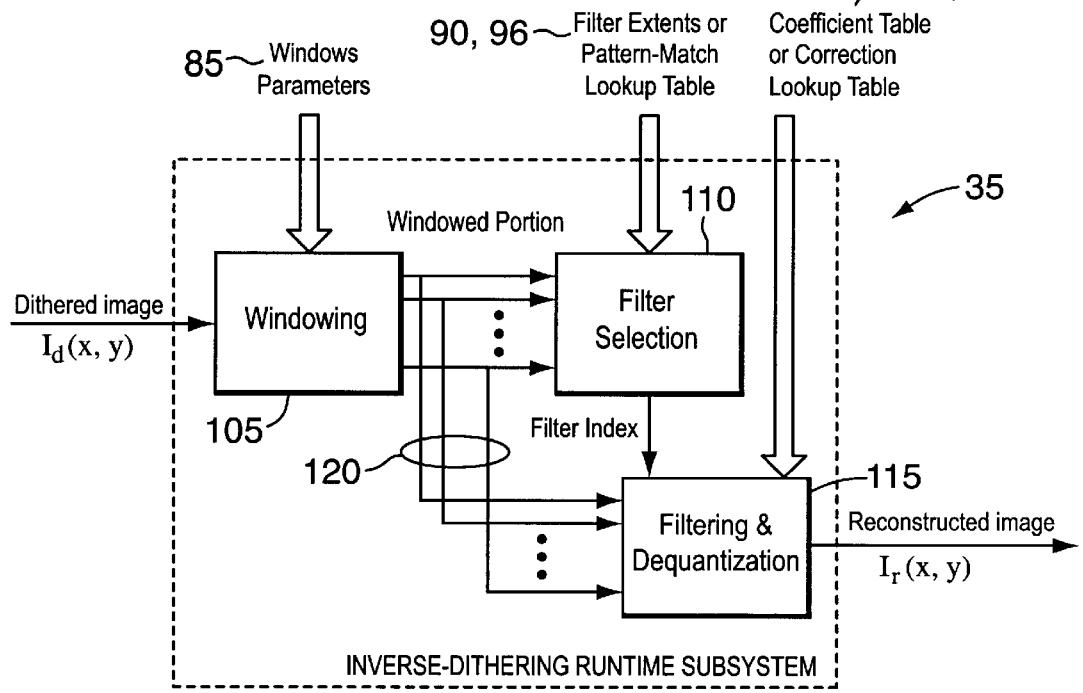
FIG. 9 is a block diagram of the runtime subsystem.

Referring now to FIG. 9, there is illustrated a block diagram of the runtime subsystem 35. The runtime subsystem 35 includes a windowing module 105, filter selection module 110 and filtering and dequantization module 115. The runtime subsystem 35, receives as input the pixel values of a dithered image $I_d(x,y)$ in serial form. This data is input to the windowing module 105. The windowing module 105 utilizes the dithered image and the window parameters 85 to generate a windowed portion of the dithered image for a presently processed pixel which is output to the filter selection module 110 and filtering dequantization module 115 over parallel interface lines 120.

The windowed portion comprises an area surrounding a presently processed pixel of the dithered image. Each pixel in the dithered image is processed with an associated windowed region until all pixels are processed. The filter selection module 110 selects a filter 26 most appropriate to filter the windowed portion of the image and provides the index of the filter to the filtering and dequantization module 115. The filtering and dequantization module 115 then utilizes the filter index to select the proper filter coefficients provided by the filter set 25 for processing of the windowed portion of the image and generates the pixel value of the reconstructed image $I_r(x,y)$.

The windowing module 105 serves to highlight an area surrounding the particular pixel of the dithered image currently being processed by the runtime subsystem 35. Inverse dithering of an image is performed on a pixel-by-pixel basis. The pixels will be processed in the order in which they are generated or read from memory. Typically this means the pixels will be received in a serial raster fashion, i.e., the pixels are received from left-to-right and top-to-bottom. In theory, the order in which the pixels are received does not effect the result. However, the order in which the pixels are received does have some bearing on optimization of the process. The windowing process highlights a number of pixels surrounding the pixel currently being processed by the runtime subsystem 35. The size of the window highlighted around the currently processed pixel is given by the windowing parameters $\Delta x$, $\Delta y_1$ and $\Delta y_2$ provided by the initialization subsystem 30.

Figure 10:
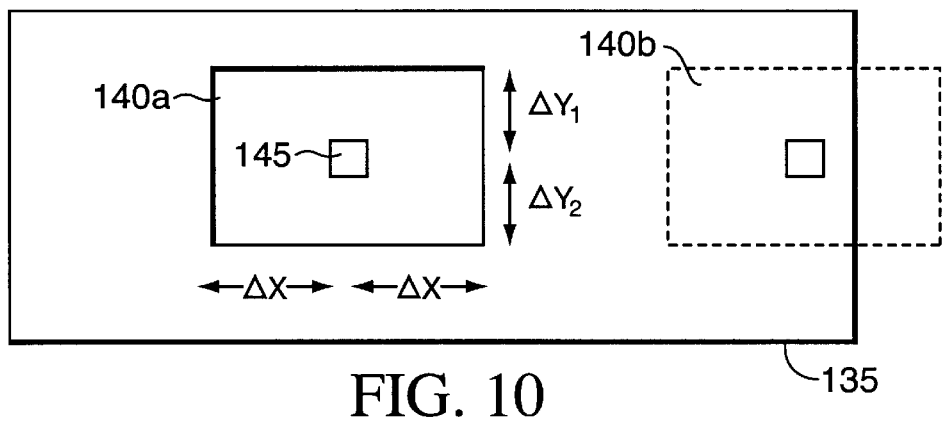
FIG. 10 is an illustration of a windowed portion of an image.

Referring now to FIG. 10, there is illustrated an example of the window 140a generated around a pixel 145. The rectangular region comprising the window 140a is defined by the four corners: $(x-\Delta x, y-\Delta y_i)$, $(x+\Delta x, y-\Delta y_1)$, $(x+\Delta x, y+\Delta y_2)$, and $(x-\Delta x, y+\Delta y_2)$ As mentioned previously with respect to the discussion of the initialization subsystem 30, the values of $\Delta x$, $\Delta y_1$ and $\Delta y_2$ are dependent upon the extents of the largest filter 26 within the filter set 25. Given that the pixel values in the region defined by the window 140a surrounding the processed pixel 145 are normally read into the windowing module 105 in a raster fashion, the windowing module 105 must contain enough memory to act as a buffer for storing the entire window portion 140 of the image and any pixels that would be read in between the window portions during a raster scan. In order to minimize the amount of memory required by the windowing module 105, $\Delta y_1$ and $\Delta y_2$ may be set to zero such that the windowed region 140 merely comprises a scan line including pixels on each side of the processed pixel 145.

In the case where the window region 140b extends beyond the boundary of the image 135, as illustrated generally by the dashed rectangle 140b, the values of the window region 140b extending beyond the image 135 may merely be set to zero. However, it should be realized that there are other methods for dealing with a window region extending beyond the image 135 that are also consistent with the method and apparatus of the present invention.

The filter selection module 110 performs a filter selection based upon the values of the pixels within the window region 140. The filter selection module 110 operates according to a single constraint in that the filter selected by the module must only perform low-pass filtering on a region which at the original amplitude resolution comprises a constant color or constant gray scale level. In other words, the region of support of the selected low-pass filter 26 may not contain any edges of an image. Instead, the region of support may only include portions of the image having a constant color or gray scale level.

Figure 11:
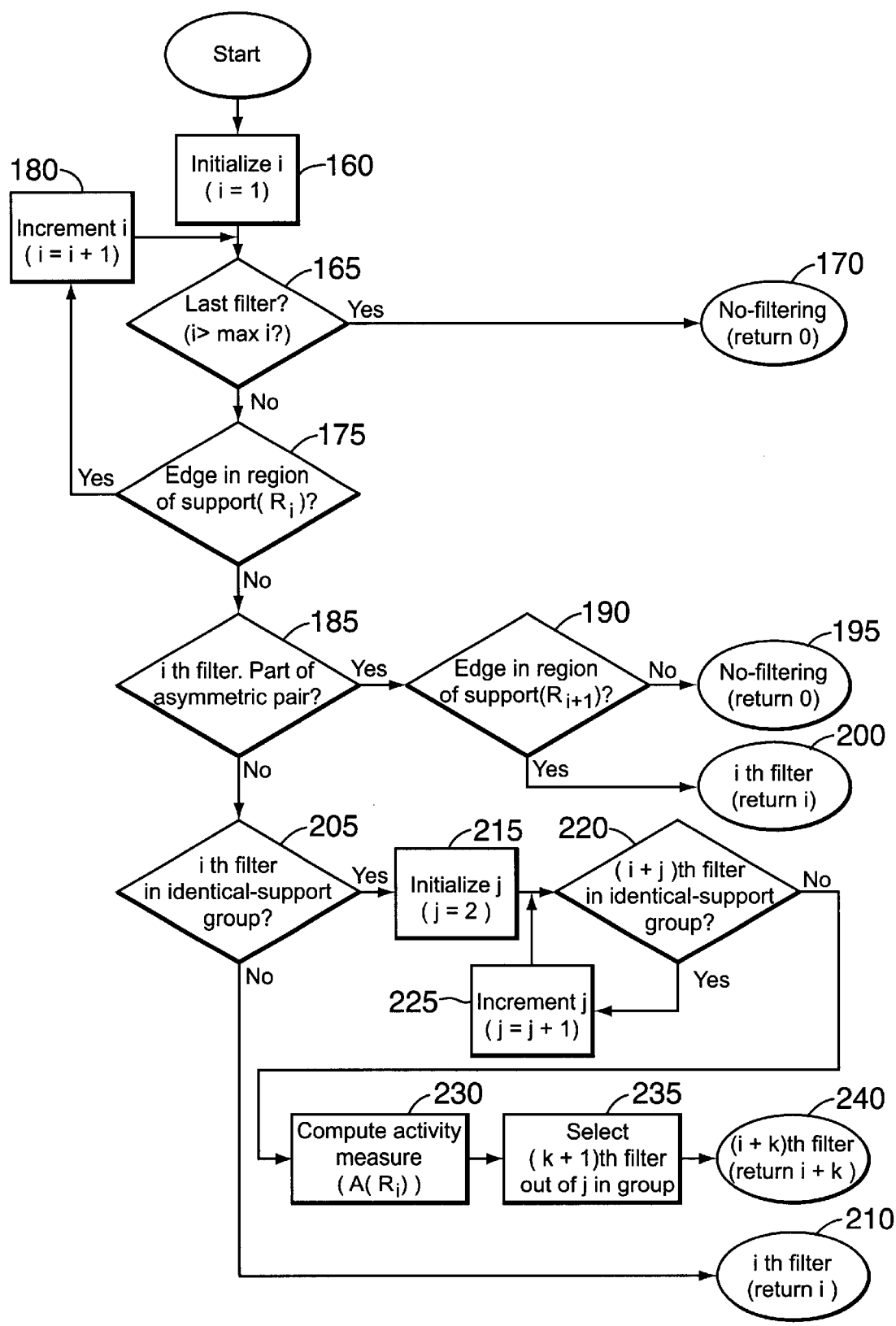
FIG. 11 is an illustration of a flow chart for the filter selection process.

Referring now to FIG. 11, there is illustrated a flow chart describing the filter selection process. The process involves the selection of the largest filter 20 from the filter set 25, which will fit the window region about the currently processed pixel that does not include an edge. The process begins at step 160 wherein the filter index i is set equal to 1. A filter index of i=1 correspond to the largest filter 26 within the filter set 25 as will be remembered from the previous discussion relating to ordering of the filters within the filter set. Next, at inquiry step 165, a determination is made if the filter index i equals the maximum filter index i. If so, this indicates that no filtering is to be performed on the presently processed pixel at step 170 and index zero is selected.

If inquiry 165 determines the filter is not the last filter, inquiry step 175 determines whether an edge of the image exits within the region of support ($R_i$) of the filter 26. If an image edge exist within the region of support, control passes to step 180 to increment the filter index i such that the next, smaller filter may be selected. Particular methods for determining whether an image edge exist within the region of support will be more fully discussed in a moment.

If an image edge is not detected in the region of support at inquiry step 175, inquiry step 185 determines whether the presently selected filter 26 is a member of an asymmetric filter pair. If so, inquiry step 190 determines whether an image edge exist within the region of support of the next filter within the filter set which comprises the asymmetric pair. If edges are absent in the regions of support of both asymmetric filters, the process returns at step 195 an index zero indicating no filtering of the pixel. Otherwise, the process returns at step 200 the current filter index.

If the current filter is not a member of an asymmetric filter pair, inquiry step 205 determines whether the filter is a member of an identical support group filter. If not, the current filter index is returned at step 210. If the current filter is a member of an identical support filter, the process will first determine the number of filters contained within the identical support filter group and set this equal to j at steps 215, 220 and 225. Once the number of filters within the identical support group is determined, the process calculates the activity measure $A(R_i)$ of the region of support for the present filter according to the equation $$A(R_i) = \min\left[\left(\sum_{(u,v)\in R_i} |I_d(u,v) - I_d(x,y)|\right), \left(E_i - \sum_{(u,v)\in R_i} |I_d(u,v) - I_d(x,y)|\right)\right]. \quad (18)$$

Using the activity measure, the (K+1)th filter in the identical support group will be selected at step 235 where K satisfies criteria $$\frac{j}{k} < \frac{2A(R_i)}{E_i} \le \frac{k+1}{j}. \quad (19)$$

and can be rewritten as $$k = \text{ceiling}\left(\frac{2jA(R_i)}{E_i}\right) - 1. \quad (20)$$

Once k is calculated, the filter index (i+k) is returned at step 240. The activity measure indicates the magnitude of local variation in the dithered image.

The process of edge detection during the filter selection process described in FIG. 11 will now be more fully discussed. Edge detection is performed to insure that low-pass filtering is done only on regions of the image that are originally of a constant color or gray scale level. In a dithered image, constant color or gray scale regions are marked by the characteristic that the pixels values are always within one resolution level of each other. In some cases, there are recognizable patterns within the dithered region of an image. These particular characteristics lead to edge detection methods that are unique and simple to implement.

One method of edge detection examines a map indicating differences between pixel values in a selected region (region of support) and the center pixel that is currently being processed. For the region to be declared edge free, the difference map must include either all zeros and ones are all zeros and negative ones. This indicates all pixels in the selected region are within one resolution level of each other. An example of this is illustrated in Table 1 below.

TABLE 1

| Pixel Values (center in bold) | Difference Map | Edge Detection |
| --- | --- | --- |
| 5, 4, 5, 5, 4, | 0, −1, 0, 0, −1 | no edge |
| 6, 7, 6, 6, 5 | 0, 1, 0, 0, −1 | edge |
| 5, 7, 6, 6, 6 | 0, 1, 0, 0, 0 | no edge |
| 5, 7, 4, 5, 4 | 1, 2, 0, 1, 0 | edge |

The region under consideration in line 1 includes pixels having resolution values 5,4,5,5,4 with the center pixel, having a value of 5, being the currently processed pixel. The difference map is generated at each position by subtracting the center pixel from each pixel position to generate the indicated difference map including 0, −1, 0, 0, −1. The difference map in the first line includes only zeros 15 and negative ones. This indicates that no edge is included within the region. A similar indication is provided in line 3, wherein only zeros and ones are included within the difference map. Lines 2 and 4 include difference maps providing an indication that an edge exist within the region. In line 2, this is because both 1 and negative 1 are included with the zeros of the difference map. In line 4, this indication is provided by the 2 within the second position of the difference map.

The use of difference maps for edge detection methods is not a perfect process. In some cases, false negatives may be generated where the procedure fails to detect edges in the image. This leads to undesirable blurring of the restored image. For certain dithering methods, edge detection may be improved by observing that only a limited number of patterns can occur within the difference maps of regions having a constant color or gray level. Consider, for example, the dither patterns generated by an 8×1 one dimensional recursive tessellation array, such as [0,4,2,6,1,5,3,7]. The valid dither patterns for this array are illustrated in Table 2.

TABLE 2

Valid Dither Patterns

| | |
|---|---|
| 0, 0, 0, 0, 0, 0, 0, 0 | 0, 0, 0, 0, 0, 0, 0, 1 |
| 0, 0, 0, 1, 0, 0, 0, 1 | 0, 0, 0, 1, 0, 1, 0, 1 |
| 0, 1, 0, 1, 0, 1, 0, 1 | 0, 1, 0, 1, 0, 1, 1, 1 |
| 0, 1, 1, 1, 0, 1, 1, 1 | 0, 1, 1, 1, 1, 1, 1, 1 |

If the region of support is 5×1, the number of possible 5×1 difference maps may be simply observed. For example, 0, 1, 0, 1, 0, 1, 0, 1 ⟶ 0, -1, 0, -1, 0

0, 1, 0, 10, 1, 0, 1 ⟶ 0, 1, 0, 10

All valid 5 by 1 difference maps are illustrated below in Table 3.

TABLE 3

Valid Difference Maps

| | | |
|---|---|---|
| ±1, 0, 0, 0, 0 | 0, 0, 0, 0, ±1 | 0, ±1, 0, ±1, ±1 |
| 0, ±1, 0, 0, 0 | ±1, 0, 0, 0, ±1 | ±1, ±1, 0, ±1, 0 |
| 0, 0, 0, ±1, 0 | 0, ±1, 0, ±1, 0 | ±1, ±1, 0, ±1, ±1 |

Thus, once a difference map for a presently processed bit and region of support is determined, the difference map can be compared to difference maps within a table of valid difference maps indicating a constant color or gray scale at the filter selection module 110. If a corresponding difference map is found within the table then an edge does not occur within the presently processed region. If no corresponding valid difference map is detected an edge therefore must exist in the region of support. The difference map table is provided by the pattern match lookup table module 95 of the initialization subsystem 30.

If the phase by which the dither template was originally applied to the image is known, the number of valid difference maps at each specific pixel location may be further reduced. Using the more restrictive table of difference maps at each pixel location for pattern matching, it is possible to further reduce the number of false negatives arising in edge detection.

Figure 12:
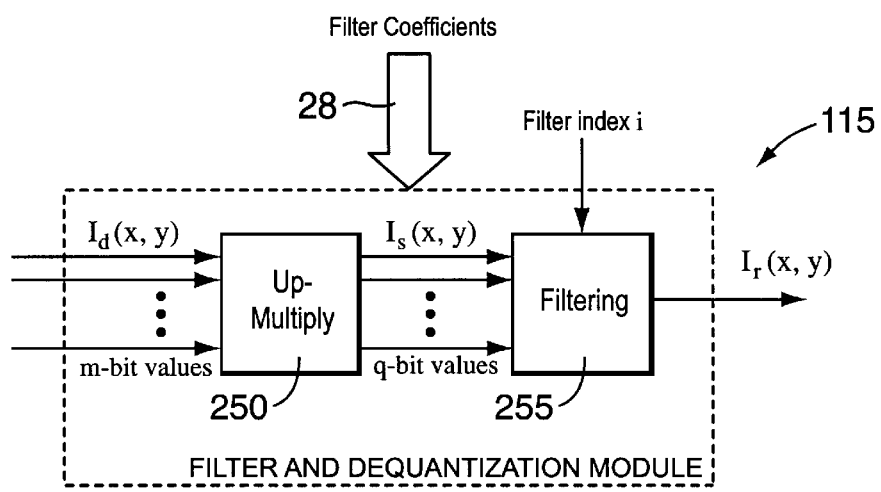
FIG. 12 is a block diagram of the filter and dequantization module.

Referring now to FIG. 12, there is illustrated the filtering and dequantization module 115, which receives input bit values of the dithered image $I_d(x,y)$, the filter coefficients 28 of the filter set 25 and the filter index of the selected filter 26 to generate an inverse dithered image $I_r(x,y)$ having an increased bit depth. The received input pixel values $I_d(x,y)$ have a resolution of m bits. These are up multiplied at the up-multiplied module 250 by gain G as defined in equation 17 to generate pixels of increased resolution with q-bit values. Therefore, the up-multiplied pixel values $I_s(x,y)$ are given by $$I_s(x,y) = G \cdot I_d(x,y). \quad (21)$$

The up-multiplied pixel values $I_s(x,y)$ are then processed by the filtering module 255 wherein the up-multiplied pixel values are multiplied and summed with the filter coefficients associated with the filter index provided by the filter selection module 210. The filtering is performed on the scaled pixels according to the equation $$I_r(x, y) = \sum_u \sum_v h_i(u, v) I_s(x - u, y - v). \quad (22)$$

Note that the first summation over u will contain $X_{i1}+X_{i2}+1$ terms whereas the second summation over V will contain $Y_{i1}+Y_{i2}+1$ terms. The filtering process may yield output values that are beyond the range of q-bits. When this happens, values above $2^q-1$ are clamped to $2^q-1$ while values below zero are clamped to 0.

Figure 13:
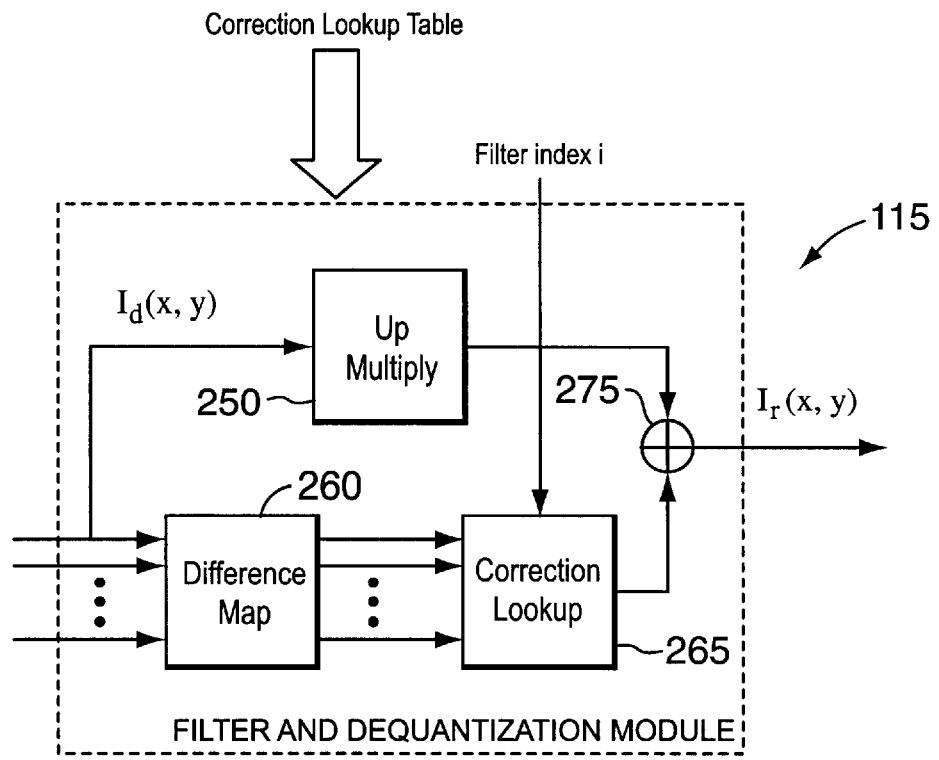
FIG. 13 is a block diagram of an alternative embodiment of the filter and dequantization module.

Referring now to FIG. 13, there is illustrated an alternative embodiment of a more efficient implementation of the filter and the dequantization module 115. The filtering process described in the equation 22 above may be rewritten in the following manner.

$$I_r(x, y) = \sum_u \sum_v h_i(u, v) I_s(x - u, y - v) \quad (23)$$

$$= \sum_u \sum_v h_i(u, v) \cdot G \cdot I_d(x - u, y - v)$$

$$= \sum_u \sum_v h_i(u, v) \cdot G \cdot I_d(x, y) +$$

$$\sum_u \sum_v h_i(u, v) \cdot G \cdot (I_d(x - u, y - v) - I_d(x, y))$$

$$= G \cdot I_d(x, y) + G \cdot \sum_u \sum_v h_i(u, v) \cdot$$

$$G \cdot (I_d(x - u, y - v) - I_d(x, y))$$

The correction term $C_i(x,y)$ may be defined as $$C_i(x, y) = \sum_u \sum_v h_i(u, v) G(I_d(x - u, y - v) - I_d(x, y)) \quad (24)$$

The terms $(I(x-u,y-v)-I(x,y))$ are the same as the entries of the difference maps described previously with respect to the discussions of edge protection methods. This greatly simplifies the computation of the correction term. A look-up table provided by the correction lookup table generator 100 of the initialization subsystem 35 may be used for its generation. Take, for example, the case wherein the 5×1 region of Table 3 there are only 18 possible cases. The look-up table for the 5×1 filter would only contain 18 entries. The dequantization and filtering module which increases the bit depth of the dithered image may now be described by the equation:

$$I_r(x,y) = G \cdot I_d(x,y) + C_i(x,y). \quad (25)$$

Thus, the input dithered images are multiplied at up-multiplied nodule 250 and added together at adder 275 with the correction term generated by the difference map module 260, which generates a difference map of the processed bits, and the correction table 265 which compares the difference map from module 260 with a lookup table provided by the initialization subsystem 30. Note that we have only one multiplication as opposed to before.

Figure 14:
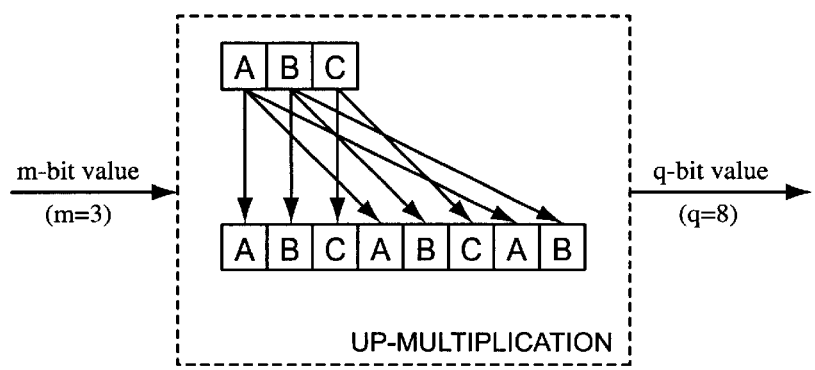
FIG. 14 is an illustration of one embodiment of the up-multiplication module.

Finally, as illustrated in FIG. 14, the reconstruction of a q-bit integer value from a m-bit integer value within the up-multiplied module 250 value can be approximated by a bit replication process. This eliminates the last remaining multiplication step. In the illustrated case a 3-bit integer value is scaled to an 8-bit integer value. This process is described herein.

In the case of color images, each pixel is represented by a three dimensional vector wherein each vector corresponded to one of three channels: Red, green or blue, i.e, $$I(x,y)=(I_R(x,y),I_G(x,y),I_B(x,y)). \quad (26)$$

or alternatively, may represent the luminance and the two chrominance channels as in $$I(x,y)=(I_y(x,y),I_u(x,y),I_v(x,y)) \quad (27)$$

Figure 15:
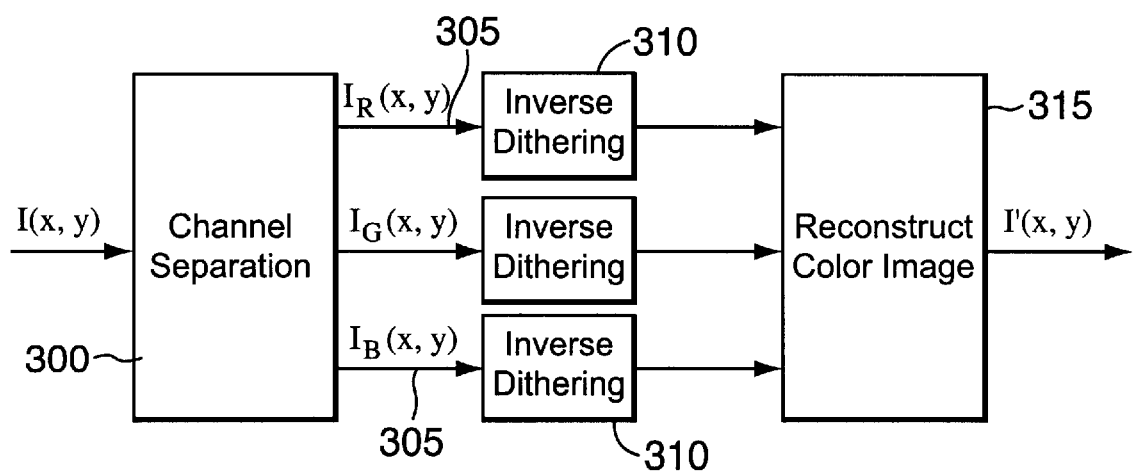
FIG. 15 is a block diagram of a system for inverse dithering color images.

Color images are processed by separating them into their individual components before inverse dithering each component. This is illustrated in FIG. 15, wherein a dithered image I(x,y) is provided to a channel separator 300 to separate the image into red, green and blue vectors 305. The red, green and blue vectors 305 are inverse dithered at 310 in the manner described previously. The inverse dithered images are then input to a combining module 315 wherein the color image is reconstructed from the inverse dithered vectors.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for inverse dithering a dithered image using a selected filter, comprising the steps of:
   receiving input pixel values of a selected portion of the dithered image, wherein the selected portion is a region surrounding a particular pixel;
   selecting a filter from a set of filters, wherein the selected filter is the one having a region of support larger than that of any other filter in the set but fitting the region surrounding the particular pixel without including an edge;
   up-multiplying the pixel values of the selected portion of the dithered image from a first amplitude resolution to a second amplitude resolution; and
   filtering pixel values of the second amplitude resolution image by the selected filter to generate pixel values of a selected portion of the inverse dithered image.

2. The method of claim 1, further comprising the step of repeating the up-multiplying and filtering steps for all portions of the dithered image.

3. The method of claim 1, wherein the step of up-multiplying further includes performing a bit replication process on the pixel values of the selected portion of the dithered image.

4. The method of claim 1, wherein the step of filtering further includes the step of multiplying the pixel values of the second amplitude resolution image by filter coefficients of the selected filter to generate the pixel values of the selected portion of the inverse dithered image.

5. The method of claim 1,
   wherein the set of filters is arranged in a pre-selected order;
   wherein each filter in the set has an index; and
   wherein the filters in the set are ordered such that:
      filters with a with a lower index have a larger region of support than filters having a higher index;
      filters having asymmetric regions of support have adjacent indices; and
      filters having identical regions of support have different cutoff frequencies, filters with lower cutoff frequencies having lower indices.

6. A method for inverse dithering a dithered image using a selected filter, comprising the steps of:
   receiving input pixel values of a selected portion of the dithered images;
   up-multiplying the pixel values of the selected portion of the dithered image from a first amplitude resolution to a second amplitude resolution; and
   filtering pixel values of the second amplitude resolution image by the selected filter to generate pixel values of a selected portion of the inverse dithered image,
   wherein the step of filtering includes the steps of:
      obtaining a correction factor from a correction table based upon a difference map of the selected portion of the inverse dithered image; and
      adding the correction factor to the up-multiplied pixel values of the selected portion of the dithered image to generate the pixel values of the selected portion of the inverse dithered image.

7. The method of claim 6, further comprising the step off generating the difference map of the selected portion of the inverse dithered image.

8. The method of claim 7, further comprising the step of generating correction factors of the correction table from coefficients of a filter set including the selected filter and the difference map.

9. A computer program product comprising:
   a computer usable medium having computer readable program code means embodied therein for inverse dithering a dithered image, the computer readable program code means in said computer program product comprising:
   computer readable program code means for causing a computer to:
      receive input pixel values of a selected portion of the dithered image, wherein the selected portion is a region surrounding a particular pixel;
      select a filter from a set of filters, wherein the selected filter is the one having a region of support larger than that of any other filter in the set but fitting the region surrounding the particular pixel without including an edge;
      up-multiply the pixel values of the selected portion of the dithered image from a first amplitude resolution to a second amplitude resolution; and
      filter pixel values of the second amplitude resolution image by the selected filter to generate pixel values of a selected portion of the inverse dithered image.

10. The computer program product of claim 9, wherein computer readable program means further includes program code means for causing the computer to repeat the up-multiplying and filtering steps for all portions of the dithered image.

11. The computer program product of claim 9, wherein computer readable program means further includes program code means for causing the computer to up-multiply the pixel values of the selected portion of the dithered image using bit replication.

12. The computer program product of claim 9, wherein computer readable program means further includes program code means for causing the computer to multiply the pixel values of the second amplitude resolution image by filter coefficients of the selected filter to generate the pixel values of the selected portion of the inverse dither image.

13. The computer program product of claim 9,
wherein the set of filters is arranged in a pre-selected order;
wherein each filter in the set has an index; and
wherein the filters in the set are ordered such that:
filters with a with a lower index have a larger region of support than filters having a higher index;
filters having asymmetric regions of support have adjacent indices; and
filters having identical regions of support have different cutoff frequencies, filters with lower cutoff frequencies having lower indices.

14. A computer program product comprising:
a computer usable medium having computer readable program code means embodied therein for inverse dithering a dithered image, the computer readable program code means in said computer program product comprising:
computer readable program code means for causing a computer to:
receive input pixel values of a selected portion of the dithered image:
up-multiply the pixel values of the selected portion of the dithered image from a first amplitude resolution to a second amplitude resolution; and
filter pixel values of the second amplitude resolution image by the selected filter to generate pixel values of a selected portion of the inverse dithered image by:
obtaining a correction factor from a correction table based upon a difference map of the selected portion of the inverse dithered image; and
adding the correction factor to the up-multiplied pixel values of the selected portion of the dithered image to generate the pixel values of the selected portion of the dithered image.

15. The computer program product of claim 14, wherein computer readable program means further includes program code means for causing the computer to generate the difference map of the selected portion of the inverse dithered image.

16. The computer program product of claim 15, wherein computer readable program means further includes program code means for causing the computer to generate correction factors of the correction table from coefficients of a filter set including the selected filter and the difference map.

17. A system for inverse dithering a dithered image, comprising:
a set of digital filters; and
a processor configured to:
receive input pixel values of a selected portion of the dithered image, wherein the selected portion is a region surrounding a particular pixel;
select a filter from the set of filters, wherein the selected filter is the one having a region of support larger than that of any other filter in the set but fitting the region surrounding the particular pixel without including an edge;
up-multiply the pixel values of the selected portion of the dithered image from a first amplitude resolution to a second amplitude resolution; and
filter pixel values of the second amplitude resolution image by the selected filter to generate pixel values of a selected portion of the inverse dithered image.

18. The system of claim 17, wherein the processor is further configured to repeat the up-multiplying and filtering steps for all portions of the dithered image.

19. The system of claim 17, wherein the processor is further configured to up-multiply the pixel values of the selected portion of the dithered image using bit replication.

20. The system of claim 17, wherein the processor is further configured to multiply the pixel values of the second amplitude resolution image by filter coefficients of the selected filter to generate the pixel values of the selected portion of the inverse dither image.

21. The system of claim 17,
wherein the set of filters is arranged in a pre-selected order;
wherein each filter in the set has an index; and
wherein the filters in the set are ordered such that:
filters with a with a lower index have a larger region of support than filters having a higher index;
filters having asymmetric regions of support have adjacent indices; and
filters having identical regions of support have different cutoff frequencies, filters with lower cutoff frequencies having lower indices.

22. A system for inverse dithering a dithered image, comprising:
a plurality of digital filters arranged in a preselected order; and
a processor configured to:
receive input pixel values of a selected portion of the dithered image;
up-multiply the pixel values of the selected portion of the dithered image from a first amplitude resolution to a second amplitude resolution; and
filter pixel values of the second amplitude resolution image by the selected filter to generate pixel values of a selected portion of the inverse dithered image by
obtaining a correction factor from a correction table based upon a difference map of the selected portion of the inverse dithered image and
adding the correction factor to the up-multiplied pixel values of the selected portion of the dithered image to generate the pixel values of the selected portion of the dithered image.

23. The system of claim 22, wherein the processor is further configured to generate the difference map of the selected portion of the inverse dithered image.

24. The system of claim 22, wherein the processor is further configured to generate the correction table from coefficients of a filter set including the selected filter and the difference map.

25. A system for inverse dithering of a dithered image, comprising:
a windowing module that receives pixel values of the dithered image and window parameters to generate a windowed portion of the dithered image about a given pixel, the windowed portion being a region about a given pixel;
a filter selection module that receives the windowed portion of the dithered image from the windowing module and selects a filter from a set of filters for filtering the windowed portion of the dithered image, the filter selection module providing an indication of the selected filter and the selected filter being the one having a region of support larger than that of any other filter in the set but fitting the windowed portion about the given pixel without including an edge; and a filtering and dequantization module that receives the windowed portion of the dithered image and the indication of the selected filter to select corresponding filter coefficients for processing of the windowed portion of the image to generate the pixel values of the inverse dithered image.

26. The system of claim 25, wherein the set of filters is arranged in a pre-selected order;

wherein each filter in the set has an index; and wherein the filters in the set are ordered such that:
    filters with a with a lower index have a larger region of support than filters having a higher index;
    filters having asymmetric regions of support have adjacent indices; and
    filters having identical regions of support have different cutoff frequencies, filters with lower cutoff frequencies having lower indices.

27. A method for inverse dithering of a dithered image, comprising:

receiving pixel values of a portion of the dithered image, wherein the portion is a region about a particular pixel;

selecting a filter from a set of filters for filtering the portion of the dithered image, wherein the selected filter is the one having a region of support larger than that of any other filter in the set but fitting the portion about the particular pixel without including an edge; and processing the portion of the image to generate the pixel values of the inverse dithered image.

28. The method of claim 27, wherein the set of filters is arranged in a pre-selected order;

wherein each filter in the set has an index; and wherein the filters in the set are ordered such that:
    filters with a with a lower index have a larger region of support than filters having a higher index;
    filters having asymmetric regions of support have adjacent indices; and
    filters having identical regions of support have different cutoff frequencies, filters with lower cutoff frequencies having lower indices.

* * * * *

UNITED STATES PATENT AND TRADEMARK OFFICE
CERTIFICATE OF CORRECTION

PATENT NO. : 6,347,160 B1
DATED : February 12, 2002
INVENTOR(S) : Cheung et al.

It is certified that error appears in the above-identified patent and that said Letters Patent is hereby corrected as shown below:

Title page,
Item [75], Inventors, reads "Robert MacNamara" it should read:
-- Robert McNamara --.

Column 5,
Line 19, Formula 6 reads $R_i = \{(x,y) \mid h_i(x',y) \neq 0 \, \forall x' \leq x \text{ and } y' \leq y\}$ (6) it should read: $-- R_i = \{(x,y) \mid h_i(x',y') \neq 0 \, \forall x' \leq x \text{ and } y' \leq y\}$ (6)--

Line 27, is blank; omitted formula 8 should be added and it should read $$-- \iint_{\sqrt{f_x^2+f_y^2} \leq f_c} H_i(\omega_x, \omega_y) = \frac{3}{4} \iint_{all(f_x,f_y)} H_i(f_x, f_y) \quad (8)--$$

Line 31, Formula 9 reads $$\iint_{\sqrt{f_x^2+f_y^2} \leq f_c} H_i(f_x, f_y) = \frac{3}{4} \iint_{all(f_x,f_y)} H_i(f_x, f_y) \quad (9)$$

it should read:

$$-- \iint_{\sqrt{\omega_x^2+\omega_y^2} \leq \omega_c} H_i(\omega_x, \omega_y) = \frac{3}{4} \iint_{all(\omega_x,\omega_y)} H_i(\omega_x, \omega_y) \quad (9)--$$

Column 6,
Line 29, reads "having indices of 5 and 6 comprises and adjacent identical" it should read -- having indices of 5 and 6 comprises an adjacent identical --.

Column 9,
Line 29, reads "the selection of the largest filter 20 from the filter set 25" it should read -- the selection of the largest filter 26 from the filter set 25 --;
Line 43, reads "exits within the region of support ($R_i$) of the filter 26. If an" it should read -- exists within the region of support (Ri) of the filter 26. If an --

UNITED STATES PATENT AND TRADEMARK OFFICE
CERTIFICATE OF CORRECTION

PATENT NO. : 6,347,160 B1
DATED : February 12, 2002
INVENTOR(S) : Cheung et al.

It is certified that error appears in the above-identified patent and that said Letters Patent is hereby corrected as shown below:

Column 10,
Line 41, reads "difference map must include either all zeros and ones are all" it should read -- difference map must include either all zeros and ones or all --;
Line 49, Table 1, that portion that reads "(center in bold)" should be deleted.
Line 61, reads "difference map in the first line includes only zeros 15 and" it should read -- difference map in the first line includes only zeros and --.

Column 11,
Line 65 reads "have a resolution of m bits. These are up multiplied at the" it should read -- have a resolution of m bits. These are up-multiplied at the --.

Column 12,
Formula 21 reads "$(I_x(x,y)=G.I_d(x,y)$." it should read -- $(I_s(x,y)=G.I_d(x,y)$. --

Signed and Sealed this

Twentieth Day of July, 2004

JON W. DUDAS
*Acting Director of the United States Patent and Trademark Office*